US010719900B2

United States Patent
Griesmann et al.

(10) Patent No.: US 10,719,900 B2
(45) Date of Patent: Jul. 21, 2020

(54) METHODS AND APPARATUS TO PERFORM ACTIONS IN PUBLIC SAFETY INCIDENTS BASED ON ACTIONS PERFORMED IN PRIOR INCIDENTS

(71) Applicant: MOTOROLA SOLUTIONS, INC, Chicago, IL (US)

(72) Inventors: Daniel S Griesmann, Villa Park, IL (US); Randy L Ekl, Lake Zurich, IL (US); Karen Suttmann, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 319 days.

(21) Appl. No.: 15/290,238

(22) Filed: Oct. 11, 2016

(65) Prior Publication Data

US 2018/0101923 A1    Apr. 12, 2018

(51) Int. Cl.
*G06Q 50/26* (2012.01)
*G06Q 10/06* (2012.01)
(Continued)

(52) U.S. Cl.
CPC .............. *G06Q 50/265* (2013.01); *G06N 5/04* (2013.01); *G06Q 10/00* (2013.01);
(Continued)

(58) Field of Classification Search
CPC ........... G06Q 50/265; G06Q 10/06311; G06Q 10/063112; G06Q 10/0631; G06Q 10/00
(Continued)

(56) References Cited

U.S. PATENT DOCUMENTS 8,020,104 B2   9/2011   Robarts et al.
8,209,275 B2   6/2012   Tsui et al.
(Continued)

FOREIGN PATENT DOCUMENTS

WO       2014055939 A1    4/2014

OTHER PUBLICATIONS

Casserly, Martyn. How to stop Android apps starting automatically. techadvisor.co.uk. Jun. 21, 2016. [Retrieved on: Mar. 11, 2019]. Retrieved from internet: <URL:https://www.techadvisor.co.uk/feature/google-android/how-stop-android-apps-starting-automatically-3642206/>. entire document (Year: 2016).*
(Continued)

*Primary Examiner* — Tamara Griffin

(57) ABSTRACT

A method and apparatus to perform actions in public safety incidents based on actions performed in prior incidents are disclosed. An example method includes receiving a first set of incident information associated with the public safety incident, receiving a second set of responder information associated with at least one public safety personnel, correlating, by using a public safety recommendation engine, the first set of incident information and the second set of responder information with one or more other sets of public safety incident information and responder information associated with prior incidents, identifying, by the public safety recommendation engine, at least one correlated mobile device action from mobile device actions associated with a subset of prior public safety incidents, and causing the correlated mobile device action to be at least one of presented as a recommendation on the corresponding mobile device and performed by the corresponding mobile device.

17 Claims, 8 Drawing Sheets

(51) Int. Cl.
  *G06Q 10/00* (2012.01)
  *G06N 5/04* (2006.01)
  *H04L 12/26* (2006.01)
  *H04W 64/00* (2009.01)
  *H04W 88/02* (2009.01)
  *H04W 88/16* (2009.01)

(52) U.S. Cl.
  CPC ......... *G06Q 10/0631* (2013.01); *H04L 43/16* (2013.01); *H04W 64/00* (2013.01); *H04W 88/02* (2013.01); *H04W 88/16* (2013.01)

(58) Field of Classification Search
  USPC .................................. 705/7.13, 7.15, 325
  See application file for complete search history.

(56) References Cited

U.S. PATENT DOCUMENTS

| | | | |
|---|---|---|---|
| 9,215,553 B2 | 12/2015 | Rowles | |
| 9,459,889 B2* | 10/2016 | Huang | G06F 3/0481 |
| 9,467,795 B2 | 10/2016 | Kreitzer et al. | |
| 9,813,990 B2* | 11/2017 | Stanley-Marbell | ........................... H04W 52/0235 |
| 2004/0070515 A1* | 4/2004 | Burkley | G01S 5/0027 340/8.1 |
| 2008/0077865 A1* | 3/2008 | Hiles | G06F 3/0481 715/708 |
| 2010/0075652 A1 | 3/2010 | Keskar et al. | |
| 2010/0150122 A1* | 6/2010 | Berger | H04W 4/90 370/338 |
| 2012/0218102 A1* | 8/2012 | Bivens | G08B 25/003 340/539.13 |
| 2013/0065628 A1* | 3/2013 | Pfeffer | G08B 25/006 455/521 |
| 2013/0252591 A1* | 9/2013 | Sasaki | H04W 4/00 455/414.1 |
| 2013/0303194 A1 | 11/2013 | Rowles | |
| 2013/0325856 A1* | 12/2013 | Soto Matamala | H04W 40/242 707/724 |
| 2014/0100835 A1 | 4/2014 | Majumdar et al. | |
| 2014/0314212 A1* | 10/2014 | Bentley | H04M 3/5116 379/38 |
| 2014/0365390 A1* | 12/2014 | Braun | G06Q 50/265 705/325 |
| 2015/0245189 A1* | 8/2015 | Nalluri | G06Q 50/265 455/404.1 |
| 2015/0310729 A1 | 10/2015 | Lampert et al. | |
| 2015/0331711 A1 | 11/2015 | Huang et al. | |
| 2015/0379400 A1 | 12/2015 | Tatourian et al. | |
| 2016/0021025 A1 | 1/2016 | Patel et al. | |
| 2016/0224397 A1* | 8/2016 | Arora | H04W 4/029 |
| 2016/0343093 A1* | 11/2016 | Riland | G06Q 10/04 |
| 2017/0140285 A1* | 5/2017 | Dotan-Cohen | G06F 3/038 |
| 2017/0178490 A1* | 6/2017 | Kozloski | G08B 27/001 |

OTHER PUBLICATIONS

The International Search Report and the Written Opinion, corresponding SN: PAT/US2017/053160, filed Sep. 25, 2017, dated Nov. 14, 2017, all pages.

* cited by examiner

METHODS AND APPARATUS TO PERFORM ACTIONS IN PUBLIC SAFETY INCIDENTS BASED ON ACTIONS PERFORMED IN PRIOR INCIDENTS

BACKGROUND OF THE INVENTION

Public safety personnel (e.g., police officers, firefighters, emergency medical technicians, security contractors, infrastructure maintenance crews, and the like), while performing their job duties, frequently interact with a plurality of computing devices (e.g., mobile devices, radios, tablet computer, laptop computers, etc.). Such duties often include repeatedly handling the same or similar incidents which includes performing the same and/or similar tasks (by the same or different personnel). For example, police officers are charged with responding to and processing traffic incidents (e.g., vehicle collisions). During such handling, there are often multiple tasks to be handled by the various responding officers (e.g., setting up traffic control barriers, taking witness statements, cleaning vehicle debris, and the like). While the computing devices utilized by the public safety personnel may provide many useful applications, automation of tasks, reporting of information, and the like, the operation of such computing devices often interferes with the focus of the public safety personnel as they attempt to perform their duties and interact with the computing devices. For example, manually launching an application on a computing device may cause public safety personnel to take their eyes off of the road while driving.

Accordingly, there is a need for methods and apparatus to perform actions in public safety incidents based on actions performed in prior incidents.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
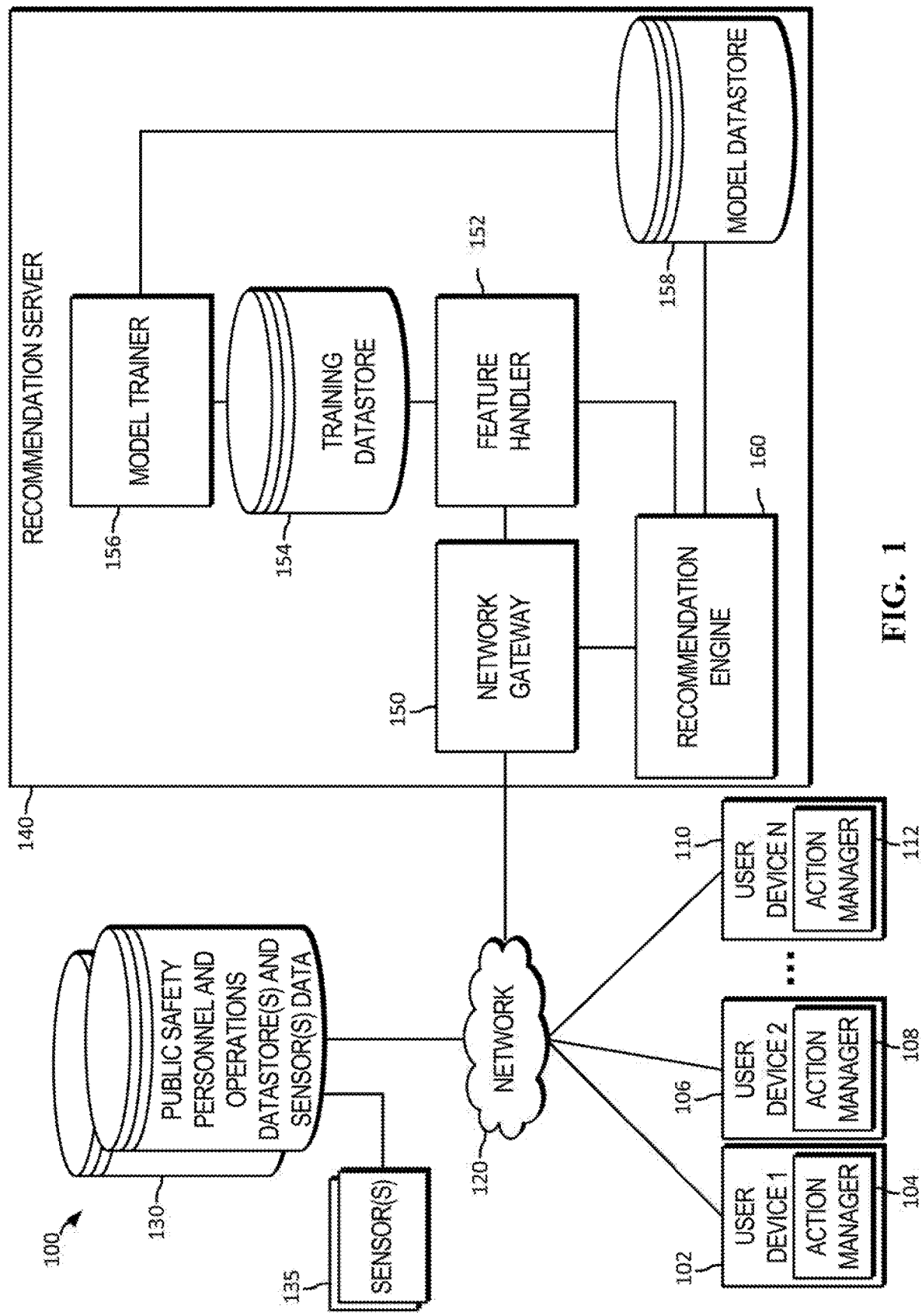
FIG. 1 is a block diagram of an environment in which a recommendation server communicates with a user device to recommend actions to be performed in association with the user device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An example method for performing an action in a public safety incident includes receiving a first set of incident information associated with the public safety incident. The example method includes identifying at least one public safety personnel and corresponding mobile device associated with the public safety incident. The example method further includes receiving a second set of responder information associated with the at least one public safety personnel and correlating, by a public safety recommendation engine, the first set of incident information and the second set of responder information with one or more other sets of public safety incident information and responder information associated with prior incidents. The example method includes identifying a subset of prior public safety incidents that meet a minimum correlation threshold and identifying, by the public safety recommendation engine, at least one correlated mobile device action from mobile device actions associated with the subset of prior public safety incidents. The example method includes causing the correlated mobile device action to be at least one of presented as a recommendation on the corresponding mobile device and performed by the corresponding mobile device.

Another example method for assigning public safety personnel to roles includes identifying at least one public safety personnel and corresponding mobile device associated with a public safety incident. The example method further includes receiving a set of responder information associated with the at least one public safety personnel. The example method further includes correlating, by using a public safety recommendation engine, the set of responder information with one or more sets of public safety incident information and responder information associated with a role assigned during prior public safety incidents. The example method further includes identifying one of the public safety personnel that is associated with a greatest correlation among the correlations associated with the set of responder information. The example method further includes causing a recommendation of assigning the one of the public safety personnel to the role to be at least one of presented as a recommendation on the corresponding mobile device and assigned by the corresponding mobile device.

An example recommendation server to generate recommendations for responding to a public safety incident includes a network interface communicatively coupled to a network, a processor communicatively coupled to the network interface, and a memory storing instructions for execution by the processor. When the instructions are executed by the processor, the instructions cause the processor to: receive a first set of incident information associated with the public safety incident, identify at least one public safety personnel and corresponding mobile device associated with the public safety incident, receive a second set of responder information associated with the at least one public safety personnel, correlate, by a public safety recommendation engine, the first set of incident information and the second set of responder information with one or more other sets of public safety incident information and responder information associated with prior incidents, identify a subset of prior public safety incidents that meet a minimum correlation threshold, identify, by the public safety recommendation engine, at least one correlated mobile device action from mobile device actions associated with the subset of prior public safety incidents, and cause the correlated mobile device action to be at least one of presented as a recommendation on the corresponding mobile device and performed by the corresponding mobile device.

An example mobile device usable for responding to public safety incidents includes a network interface communicatively coupled to a network, a processor communicatively coupled to the network interface; and a memory storing instructions for execution by the processor. When the instructions are executed by the processor, they cause the processor to receive a first set of incident information associated with the public safety incident, identify at least one public safety personnel and the mobile device associated with the public safety incident, receive a second set of responder information associated with the at least one public safety personnel, determine a correlation of the first set of incident information and the second set of responder information with one or more other sets of public safety incident information and responder information associated with prior incidents, identify a subset of prior public safety incidents that meet a minimum correlation threshold, identify at least one correlated mobile device action from mobile device actions associated with the subset of prior public safety incidents, and cause the correlated mobile device action to be at least one of presented as a recommendation on the mobile device and performed by the mobile device.

As used herein, a public safety incident is any event associated with at least one public safety personnel during which the at least one public safety personnel will perform at least one action using at least one user device. For example, a public safety incident may be a vehicle collision, traffic patrol duty, monitoring a parade route, a house fire, a pothole that is in need of repair, and the like. As described herein, public safety personnel may be assigned a role within a public safety personnel unit and/or assigned a role for responding to a public safety incident. A role is defined by and/or includes one or more tasks. For example, a role may be incident cleanup at a traffic accident or a role may be traffic management, which includes setting up barricades, rerouting traffic, controlling traffic signals, and the like. When this disclosure describes assigning a task, the disclosure applies equally to assigning a role. Similarly, when the disclosure describes utilizing information about prior assignment and/or performance of tasks in processing models to determine action recommendations, this disclosure applies equally to roles. In other words, the concepts described herein can be applied equally to roles and tasks.

FIG. 1 is a block diagram of an environment 100 in which a recommendation server communicates with a user device to recommend actions to be performed in association with the user device in accordance with some embodiments. The example environment 100 includes a plurality of example user devices 102, 106, 110 with example action managers 104, 108, 112, an example network 120, a plurality of example public safety personnel and operations datastore(s) and sensor(s) data 130, example sensor(s) 135, and an example recommendation server 140.

The example user devices 102, 106, 110 are computing devices utilized by public safety personnel when responding to a public safety incident. For example, the user devices 102, 106, 110 may include mobile computing devices, smartphones, wearable computing devices, body cameras, communication devices, land mobile radio devices, tablet computing devices, cellular telephones, laptop computing devices, desktop computing devices, and the like. The user devices 102, 106, 110 may execute applications (e.g., an application for writing parking tickets, an application for assigning tasks for responding to a public safety incident, and the like); may browse webpages, files, messages, and the like; may communicate with other ones of the example user devices 102, 106, 110, may load maps, may adjust settings of the user devices 102, 106, 110, and the like.

The user devices 102, 106, 110 of the illustrated example include the action managers 104, 108, 112, respectively. The example action manager 104, 108, 112 communicates information (e.g., context information associated with the example user devices 102, 106, 110) to the example recommendation server 140 and receives recommended actions from the example recommendation server 140 for presentation and/or performance at the example user devices 102, 106, 110. For example, during a public safety incident, the action manager 104, 108, 112 collects the context information and transmits the context information to the example recommendation server 140 to enable the recommendation server 140 to correlate the context information and/or information from other sources with information about prior incidents to determine the recommended action(s).

The example action manager 104, 108, 112 additionally stores models generated by the example recommendation server 140. Accordingly, in some situations (e.g., when the example action manager 104, 108, 112 is unable to communicate with the example recommendation server 140), the example action manager 104, 108, 112 correlates the context information and/or other information associated with a public safety incident with the locally stored models to determine, present, and/or perform recommended action(s). In another embodiment, models for use by the example action manager 104, 108, 112 may be generated by the action manager using training information collected by the action manager 104, 108, 112 and/or received from another source (e.g., from the recommendation server 140).

To facilitate the example recommendation server 140 generating models for use in recommending actions, the example action manager 104, 108, 112 communicates actions performed at the example user devices 102, 106, 110 during a public safety incident to the example recommendation server 140 along with context information associated with the public safety incident. The actions may be action requests received at/performed by the user device 102, 106, 110 (e.g., launching an application, assigning a user to perform a task, changing settings of the user device, creating a task list, assigning public safety personnel to tasks on the task list, requesting backup, presenting map and location information, selecting a radio talkgroup, creating a group, creating an agency, assigning public safety personnel to a group, assigning public safety personnel to an agency, and the like) and/or actions recommended by the example recommendation server 140 and/or the example action manager

104, 108, 112 (e.g., the action may be communicated to the recommendation server 140 with an indication of whether an acceptance or a revision of the recommended action was received).

Figure 2:
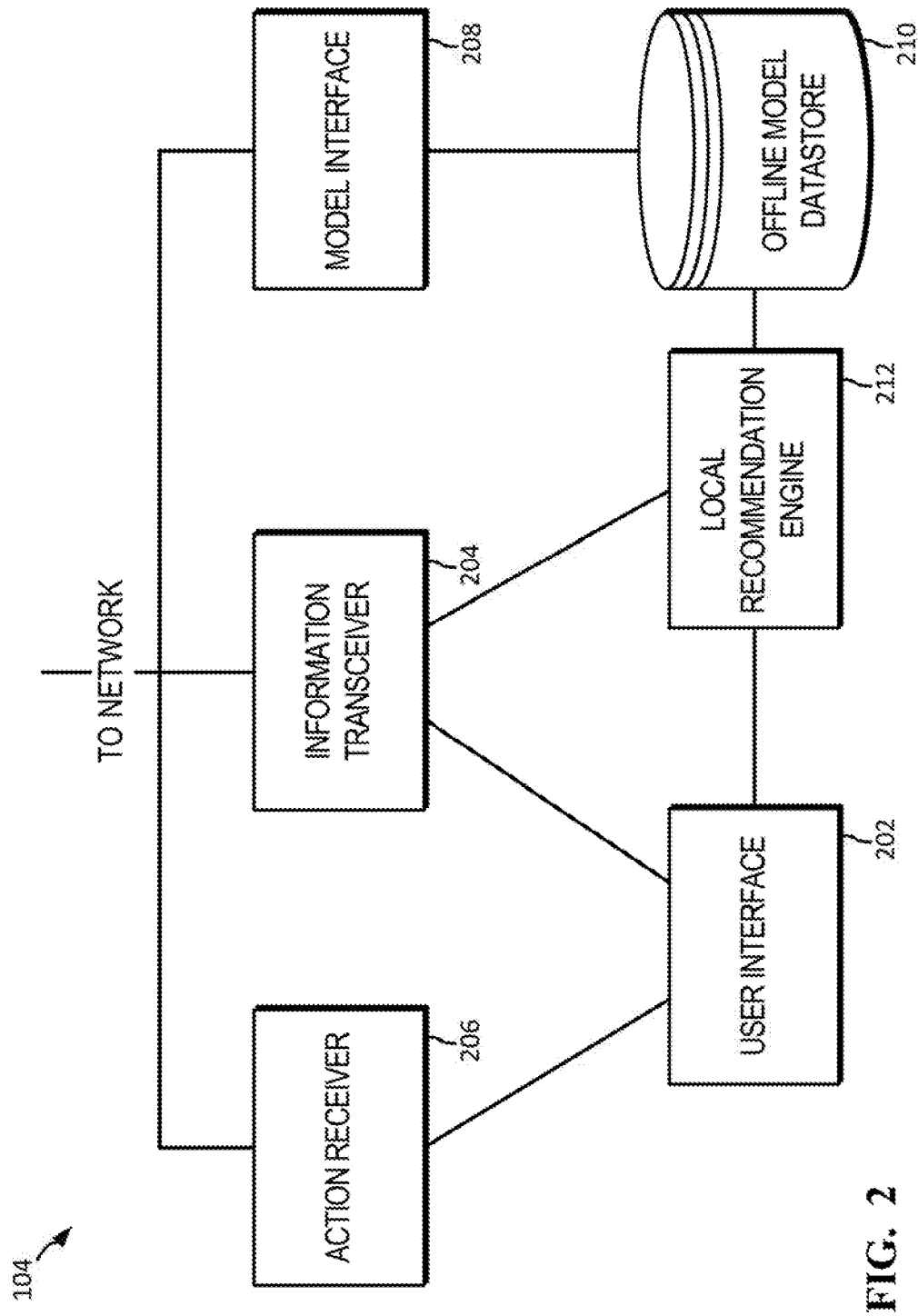
FIG. 2 is a block diagram of an example implementation of the action manager of FIG. 1 in accordance with some embodiments.

An example implementation of the example action manager 104 is described in conjunction with FIG. 2.

The example network 120 includes the Internet and local networks to communicatively couple the example user devices 102, 106, 110, the public safety personnel and operations datastore(s) and sensor(s) data 130, and the recommendation server 140. The network 120 may include any number and type of networks (e.g., local area networks, wide area networks, public networks, private networks, wired networks, wireless networks, short range communication (e.g., Bluetooth, radio frequency identification, near field communication), and the like). The devices connected to the network 120 include suitable interfaces for communicating via the network 120.

The example public safety personnel and operations datastore(s) and sensor(s) data 130 include datastore(s) and sensor(s) data that store and/or collect information to be used by the example recommendation server 140 in generating a recommended action. The data may be collected from, for example, one or more sensor(s) 135 (e.g., weather sensors, activity sensors, local sensors, environment sensors, radio frequency sensors, etc). For example, the public safety personnel and operations datastore(s) and sensor(s) data 130 may store personnel records regarding public safety personnel, may determine weather information (e.g., weather forecasts for a location of a public safety incident), may collect location information (e.g., location information associated a public safety incident, location information associated with public safety personnel, and the like), status information about public safety personnel (e.g., on duty/off duty status, previous task and/or role assignment information (e.g., identification of a particular task/role assigned to a person or information about a number of times a particular task/role has been assigned to a person), and the like), group associations of public safety personnel, connection status information for the example user devices 102, 106, 110, and the like. The example public safety personnel and operations datastore(s) and sensor(s) data 130 communicate stored and/or collected information to the example recommendation server 140 and/or the example user devices 102, 106, 110 for use in determining recommended actions to be presented and/or performed on the user devices 102, 106, 110.

In some examples, the public safety personnel and operations datastore(s) and sensor(s) data 130 include legacy systems maintained by a public safety agency for operations management. For example, the public safety personnel and operations datastore(s) and sensor(s) data 130 may include a personnel database maintained by a police department, a location tracking system, and the like. The example public safety personnel and operations datastore(s) and sensor(s) data 130 may include interfaces (e.g., an application programming interface) that enable the example recommendation server 140 and/or the example user devices 102, 106, 110 to query and/or retrieve information from the example public safety personnel and operations datastore(s) and sensor(s) data 130.

The example recommendation server 140 receives context information associated with a public safety incident from the example user devices 102, 106, 110 and/or the example public safety personnel and operations datastore(s) and sensor(s) data 130 via the example network 120 and trains models to be used in generating recommendations. In response to receiving new context information for a new public safety incident, the example recommendation server 140 correlates the new context information with the models (e.g., prior public safety incidents) to generate recommended action(s). As described below, the actions may be distributed or assigned.

The example recommendation server 140 includes an example network gateway 150, an example feature handler 152, an example training datastore 154, an example model trainer 156, an example model datastore 158, and example recommendation engine 160.

The example network gateway 150 communicatively couples the example recommendation server 140 with other devices connected to the example network 120. The example network gateway 150 is a network interface. Alternatively, the network gateway 150 may be a proxy, a router, a firewall, a web server, and the like. The example network gateway 150 communicates requests for recommended actions (e.g., received from the example user devices 102, 106, 110) to the example feature handler 152 and/or the example recommendation engine 160. The example network gateway 150 communicates recommended actions to the example user devices 102, 106, 110. Additionally, the example network gateway 150 may communicate models generated by the example recommendation server 140 to the example user devices 102, 106, 110 for storage by the example action manager 104, 108, 112 for use in locally generating recommendations (e.g., when the example action manager 104, 108, 112 cannot communicate with the example recommendation server 140).

The example feature handler 152 receives and/or retrieves context information for a public safety incident for use by the example model trainer 156 in training models and/or for use by the example recommendation engine 160 in identifying recommended actions. The context information may include any information associated with an incident and/or public safety personnel (e.g., public safety personnel responding to and/or available to respond to an incident). The example feature handler 152 receives information identifying the incident (e.g., an incident identifier) from the example action managers 104, 108, 112. Additionally, the example feature handler 152 receives information about actions performed at the user devices 102, 106, 110. The example action information includes information about the outcome of the action (e.g., an amount of time for completion of a task associated with the action, a rating of the result of the action, an indication of whether backup support (e.g., backup police officers) were needed, and the like). The feature handler 152 receives information transmitted to the example recommendation server 140 by the example public safety personnel and operations datastore(s) and sensor(s) data 130 (e.g., information pushed by the example public safety personnel and operations datastore(s) and sensor(s) data 130 and/or information requested by the example feature handler 152).

When the example feature handler 152 receives information about an action performed at one of the example user devices 102, 106, 110, the example feature handler 152 stores the information about the action and context information about the public safety incident in the example training datastore 154.

When the example feature handler 152 receives context information for a public safety incident without identification of a performed action (e.g., context information receives with a request for recommended action(s)), the example feature handler 152 provides the information to the example recommendation engine 160.

The example training datastore 154 stores information about actions and associated context information for public safety incidents for use by the example model trainer 156. The example training datastore 154 is a database. Alternatively, the example training datastore 154 may be any type of data storage and/or structure (e.g., one or more databases, files, buffers, caches, memories, external storage devices, internal storage devices, and the like).

The example model trainer 156 generates models based on actions performed during prior incidents, outcomes of those actions, and information about the prior incidents collected in the example training datastore 154. According to the illustrated example, the model trainer 156 generates a model for each incident type (e.g., based on an incident identification received at the user device 102, 106, 110 or determined from context information associated with an incident). Alternatively, the model trainer 156 may generate any number or type of models (e.g., may generate models based on similarities of context information about incidents, and the like). The example model trainer 156 generates models using neural network machine learning. Alternatively, any other type of model and/or training algorithm may be utilized (e.g., a machine learning model, an artificial intelligence model, a machine learning analysis, a artificial intelligence analysis, decision stump machine learning, clustering, supervised machine learning, unsupervised machine learning, reinforcement learning, association rule learning, Bayesian network machine learning, deep learning, deep structured learning, hierarchical learning, evolutionary algorithms, genetic algorithms, and the like). The features to be used in training the models may be received at the user device (e.g., the features may be received as inputs from a developer of the example model trainer 156 and/or the features may be selected by the machine learning algorithm (e.g., automatically selecting a subset of features from the context information that are most determinative of a recommended action)). Additionally, features from the context information may be weighted uniformly or non-uniformly (e.g., features that are of particular interest may be manually and/or automatically weighted to ensure that they contribute more dominantly to a recommendation).

The example model trainer 156 performs on-going retraining of models. For example, the example model trainer 156 performs a retraining of a model when a number of training incidents stored in the example training datastore 154 meets a threshold (e.g., is equal to and/or is greater than a minimum correlation threshold). Alternatively, in some embodiments, the example model trainer 156 may train models one time and/or only upon a received training request. For example, a set of training data may be selected by a developer and utilized for training models before the example recommendation server 140 is released for access.

The example model trainer 156 stores trained models in the example model datastore 158. In some examples, the model trainer 156 additionally transmits the trained models to the example user devices 102, 106, 110 via the example network gateway 150 and the example network 120.

The example model datastore 158 stores models trained by the example model trainer 156. The example model datastore 158 is a database. Alternatively, the example model datastore 158 may be any type of data storage and/or structure (e.g., one or more databases, files, buffers, caches, memories, external storage devices, internal storage devices, and the like).

The example recommendation engine 160 receives context information from the example feature handler 152. The example recommendation engine 160 correlates the context information with models (e.g., associations of prior incident information) retrieved from the example model datastore 158 to determine recommended action(s). Additionally or alternatively, the recommendation engine 160 may receive a request for a recommended action (e.g., in response to a user requesting an identification of an action recommendation).

To determine recommended actions, the example recommendation engine 160 determines scores for the context information with each model and identifies models that meet a threshold (e.g., equal or exceed a minimum score, equal or are less than a maximum score, and the like). When there are models with associated actions that meet the threshold, the example recommendation engine 160 transmits the recommended action(s) to the user devices 102, 106, 110 for presentation and/or performance of the action. For example, when the example action manager 104 has transmitted context information to the example recommendation engine 160, the example recommendation engine 160 transmits the identified recommended action(s) to the example user device 102.

In operation of the example environment 100, during a first time period, manual requests to perform actions are received by the example user devices 102, 106, 110 (e.g., when models have not yet been trained at the example recommendation server 140). For example, when responding to public safety incidents, the user devices 102, 106, 110 will receive requests to open applications, assign public safety personnel to tasks/roles, select a radio talkgroup, adjust settings of the example user device 102, 106, 110 (e.g., adjust volume, adjust screen brightness, adjust wireless radio settings, select a radio communication channel, and the like). The example action manager 104, 108, 112 transmits identification of the actions as well as context information (e.g., information about the incident, information about personnel responding to the incident, and the like) to the example feature handler 152 of the example recommendation server 140. The example feature handler 152 receives and/or retrieves additional context information from the example public safety personnel operations datastore(s) and sensor(s) 130. The feature handler 152 stores an association of the action(s) performed with the context information in the example training datastore 154. When sufficient training information has been stored in the example training datastore 154, the example model trainer 156 processes the training information to train/generate models, which the example model trainer 156 stores in the example model datastore 158.

During a second time period (e.g., when models have been trained at the example recommendation server 140), when the example user devices 102, 106, 110 are associated with public safety personnel responding to a public safety incident, the example action manager 104, 108, 112 transmits context information. The context information may include information about the incident, information about public safety personnel operating the example user devices 102, 106, 110, information about public safety personnel known to the action manager 104, 108, 112 to be available for responding to the public safety incident, and the like. The example feature handler 152 receives and/or requests additional context information from the example public safety personnel operations datastore(s) and sensor(s) 130. The example recommendation engine 160 determines if correlations (e.g., scores) of the context information with the data per the operations of the models in the example model datastore 158 meet a threshold. When one or more models yield a score that meets the threshold, the example recommendation engine 160 transmits identification of actions associated with the identified models to the example user devices 102, 106, 110 (e.g., to the one of the example user devices 102, 106, 110 that sent the context information for use in generating a recommended action(s)). The example user devices 102, 106, 110 present and/or perform the identified action.

In an example embodiment, the actions recommended by the recommendation server 140 are assignments of public safety personnel to tasks for responding to a public safety incident. For example, a police officer responding to a vehicle collision may want to assign multiple responding officers to various tasks for handling and clearing the vehicle collision. In such an embodiment, the model trainer 156 has trained models for each type of incident (e.g., vehicle collision, home invasion, hazardous materials spill, and the like). The models are trained based on tasks and/or roles that public safety personnel have assigned during previous incidents as well as context information (e.g., information about personnel experience with a particular task, information about personnel locations with respect to the incident, information about groups that the personnel are and/or have previously been assigned to, information about whether a user device is connected to a backend server and/or connected to other user devices by a peer-to-peer connection, information about weather near the incident, information about current time of day, information about personnel status (e.g., available, assigned to another incident, assigned to the incident under analysis)). The model may additionally be trained based on information about the incident location (e.g., neighborhood, beat, proximity to landmarks, and the like), information about radio talk group assignments, information about transportation available to the personnel (e.g., car, bicycle, horse, foot, helicopter, and the like), information about protocols regarding handling of incidents, or any other relevant information that may be obtained by the feature handler 152 of the recommendation server 140. In such an embodiment, when a task assignment application associated with the action manager 104 is opened at the user device 102, selects a new incident, and identifies the incident type, the example action manager 104 transmits the incident information and context information to the example recommendation server 140 in a request for recommended actions (e.g., recommended tasks and assignments).

In some embodiments, a request is received identifying a selected subset of personnel from among a list of available personnel to limit the personnel that may be selected for assignment to tasks (e.g., if the user wants to select a specific team of personnel, if the user knows that certain personnel are unavailable or incompatible with the tasks, if the user has knowledge of personnel training, and the like).

The example recommendation engine 160 analyzes the information received by the feature handler 152 (e.g., information received from the example user device 102 and information received and/or retrieved from the example public safety personnel and operations datastore(s) and sensor(s) data 130). The recommendation engine 160 compares the information to the model(s) associated with the example incident type and determines a set of tasks (e.g., by determining a recommended set of tasks based on tasks that have previously been assigned during the same or similar incident types in the same or similar contexts). The recommendation engine 160 further compares the identified personnel (e.g., all personnel identified by the same as available (e.g., not already assigned to another incident), the personnel selection received at the user device 102, and the like) to the tasks to determine a recommended assignment for each task.

For example, the recommendation engine 160 may score each of the available personnel against the data via the operations of a model to determine one of the available personnel with the highest score for a task and/or role. For example, the experience of the personnel in performing the task/role, the proximity of the personnel to the location of the incident, and connection status of the personnel user devices may be analyzed using the model to determine a score for each of the personnel for the task/role. The example recommendation engine 160 transmits the recommended assignments to the example user device 102 for presentation. If the example user device 102 receives an acceptance of the assignment, confirmation is sent to the example feature handler 152 to store the association of the context information and the assignment in the training datastore 154 for use in later retraining. Alternatively, if the user device 102 receives a revision or rejection of the assignment, such revision/rejection and context information is also sent to the feature handler 152 to store the association in the training datastore 154 for use in later retraining. In some embodiments, revisions to recommended assignments are given a higher weight during retraining than are user acceptances of the recommended assignment to ensure that the system quickly adapts to the desires of the users.

The example recommendation server 140 can provide many advantages for recommending actions such as assigning public safety personnel to tasks/roles. Public safety personnel often do not have as extensive a knowledge of context information as can be obtained using the methods and apparatus herein. Accordingly, the disclosed methods and apparatus facilitate the use of the available information for performing such actions. Thus, even the newest public safety personnel can receive recommendations based on the rich set of information that has been gathered over time by experienced personnel over a variety of situations and is made available to the example recommendation server 140.

While an example manner of implementing the recommendation server 104 is illustrated in FIG. 1, one or more of the elements, processes and/or devices illustrated in FIG. 1 may be combined, divided, re-arranged, omitted, eliminated and/or implemented in any other way. Further, the example network gateway 150, the example feature handler 152, the example model trainer 156, the example recommendation engine 160, and/or, more generally, the example recommendation server 140 may be implemented by hardware, software, firmware and/or any combination of hardware, software and/or firmware. Thus, for example, any of the example network gateway 150, the example feature handler 152, the example model trainer 156, the example recommendation engine 160, and/or, more generally, the example recommendation server 140 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network gateway 150, the example feature handler 152, the example model trainer 156, or the example recommendation engine 160 is/are hereby expressly defined to include a tangible computer readable storage device or storage disk such as a memory, a digital versatile disk (DVD), a compact disk (CD), a Blu-ray disk, and the like storing the software and/or firmware. Further still, the example recommendation server 140 may include one or more elements, processes and/or devices in addition to, or instead of, those illustrated in FIG. 1, and/or may include more than one of any or all of the illustrated elements, processes and devices.

FIG. 2 is a block diagram of an example implementation of the action manager 104 of FIG. 1 in accordance with some embodiments. The example implementation of FIG. 2 could additionally or alternatively implement the example action manager 108 and/or the example action manager 112.

The example action manager 104 of FIG. 2 includes an example user interface 202, an example information transceiver 204, an example action receiver 206, an example model interface 208, an example offline model datastore 210, and an example local recommendation engine 212.

The example user interface 202 presents information about recommended actions and/or presents the objects of the recommended actions (e.g., presents a recommendation to open an application, opens an application, presents a recommendation to assign personnel to tasks/roles, presents a confirmation that public safety personnel have been assigned to tasks, and the like). The example user interface 202 also receives inputs provided to the example user device 102 while public safety personnel are interacting with an interface provided by the example user interface 202 (e.g., a request to open an application, a request to approve a recommendation, a request to assign personnel to tasks, a request to receive a recommendation from the example recommendation server 140 of FIG. 1, and the like). The example user interface 202 is a software application executing on a processor of the example user device 102 to present user interfaces (e.g., graphical user interfaces, audible user interfaces, external presentation device interfaces, and the like) and receive inputs (e.g., touch screen input, keyboard input, voice input, external device input, and the like).

The example information transceiver 204 is communicatively coupled to the example recommendation server 140 to transmit incident information, context information, personnel information, and the like along with a request for an action recommendation. In addition, the example information transceiver 204 receives confirmation of actions (e.g., approval of a recommended action, performance of an action, and the like) from the example user interface 202 and transmits the information to the example recommendation server 140 for use in training models. The example information transceiver 204 may also receive requests for context information from the recommendation server 140 and may query the user interface to collect the information for transmission back to the recommendation server 140.

For example, the recommendation server 140 may transmit a list of available personnel identified by the example feature handler 152 to the example user device 102, the example information transceiver 204 will provide the list to the user interface 202 for presentation, the user interface 202 will receive input identifying a subset of the personnel, and the information transceiver 204 will transmit the identification of the subset to the example recommendation server 140.

In example situations in which the example action manager 104 is unable to communicate with the example recommendation server 140, the example information transceiver 204 may collect context information from the example public safety personnel and operations datastore(s) and sensor(s) data and transmit the information to the example local recommendation engine 212.

The example action receiver 206 is communicatively coupled to the recommendation server 140 via the example network 120 to receive action recommendation(s) generated by the example recommendation engine 160. The action receiver 206 of the illustrated example transmits the recommendation to the example user interface 202 for presentation and/or performs the identified action (e.g., opens an application identified by the recommendation).

The example model interface 208 receives models generated by the example model trainer 156 of the example recommendation server 140 and stores the models in the example offline model datastore for use by the example location recommendation engine in examples in which the action manager 104 is unable to communication with the example recommendation server 140.

The example offline model datastore 210 stores models received by the example model interface 208. The locally stored models may be utilized by the example local recommendation engine 212 when a recommended action(s) is wanted but communication is unavailable with the example recommendation engine 160 of the example recommendation server 140 (e.g., when the user device 102 is located outside of wireless network coverage), when network communication speeds are reduced, when the local recommendation engine 212 determines that sufficient computing resources are available for processing the models at the example user device 102, and the like. The example offline model datastore 210 is a database. Alternatively, the example offline model datastore 210 may be any type of data storage and/or structure (e.g., one or more databases, files, buffers, caches, memories, external storage devices, internal storage devices, and the like).

The example local recommendation engine 212 receives and correlates context information with operations of models (e.g., associations of prior incident information) retrieved from the example offline model datastore 210 to determine recommended action(s). To determine recommended actions, the example local recommendation engine 212 determines scores for the context information with each model and identifies models that meet a threshold (e.g., equal or exceed a minimum score, equal or are less than a maximum score, and the like). When there are models with associated actions that meet the threshold, the example local recommendation engine 212 transmits the recommended action(s) to the user interface 202 for presentation and/or performance of the action.

While an example manner of implementing the action manager 104 of FIG. 1 is illustrated in FIG. 2, one or more of the elements, processes and/or devices illustrated in FIG. 2 may be combined, divided, re-arranged, omitted, eliminated and/or implemented in any other way. Further, the example user interface 202, the example information transceiver 204, the example action receiver 206, the example model interface 208, the example local recommendation engine, and/or, more generally, the example 104 of FIG. 2 may be implemented by hardware, software, firmware and/or any combination of hardware, software and/or firmware. Thus, for example, any of the example user interface 202, the example information transceiver 204, the example action receiver 206, the example model interface 208, the example local recommendation engine, and/or, more generally, the example 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, user interface 202, the example information transceiver 204, the example action receiver 206, the example model interface 208, or the example local recommendation engine is/are hereby expressly defined to include a tangible computer readable storage device or storage disk such as a memory, a digital versatile disk (DVD), a compact disk (CD), a Blu-ray disk, and the like storing the software and/or firmware. Further still, the example action manager 104 of FIG. 1 may include one or more elements, processes and/or devices in addition to, or instead of, those illustrated in FIG. 2, and/or may include more than one of any or all of the illustrated elements, processes and devices.

Figure 3:
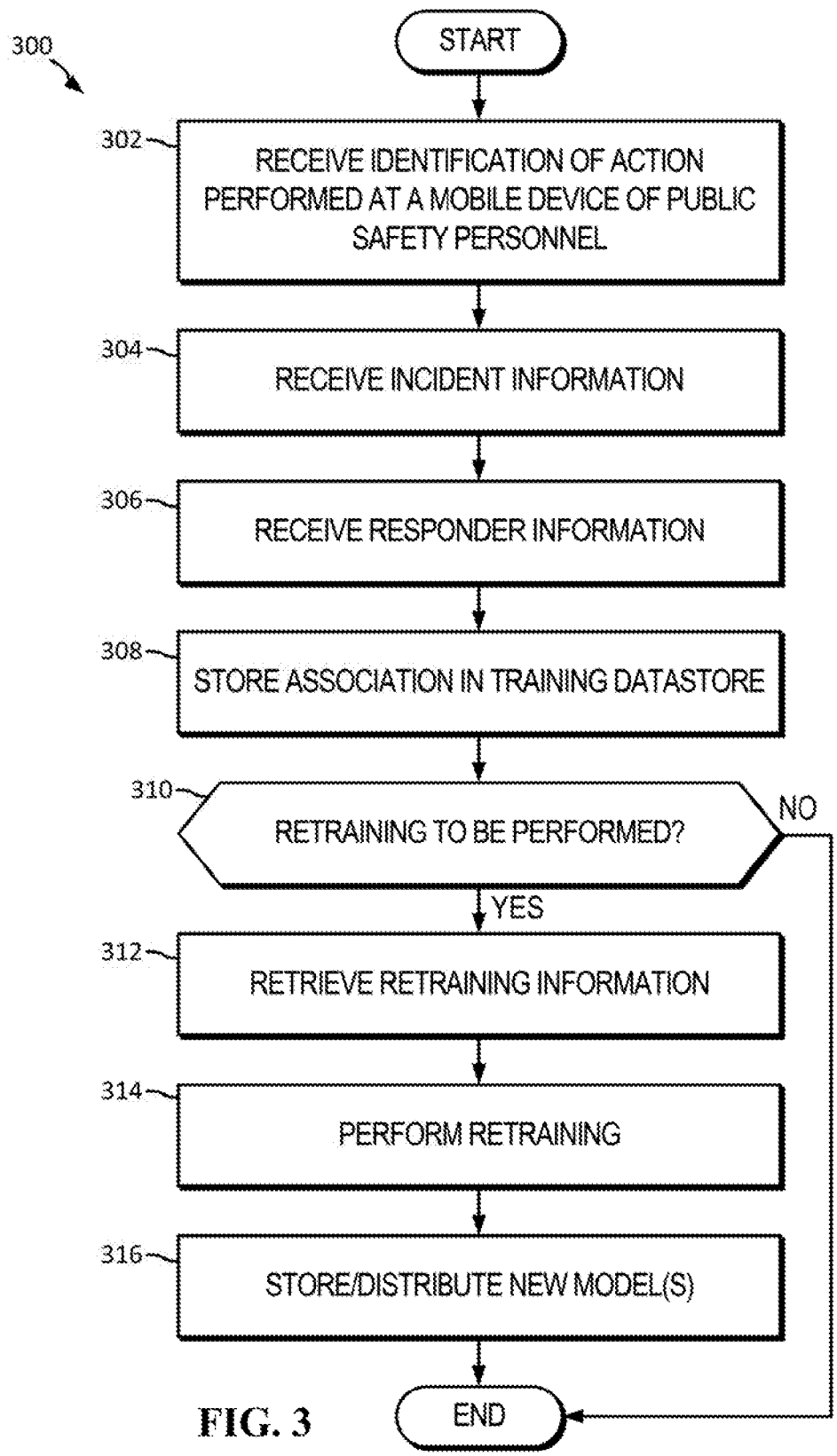
FIG. 3 is a flowchart of a method of training models of public safety incidents in accordance with some embodiments.
Figure 4:
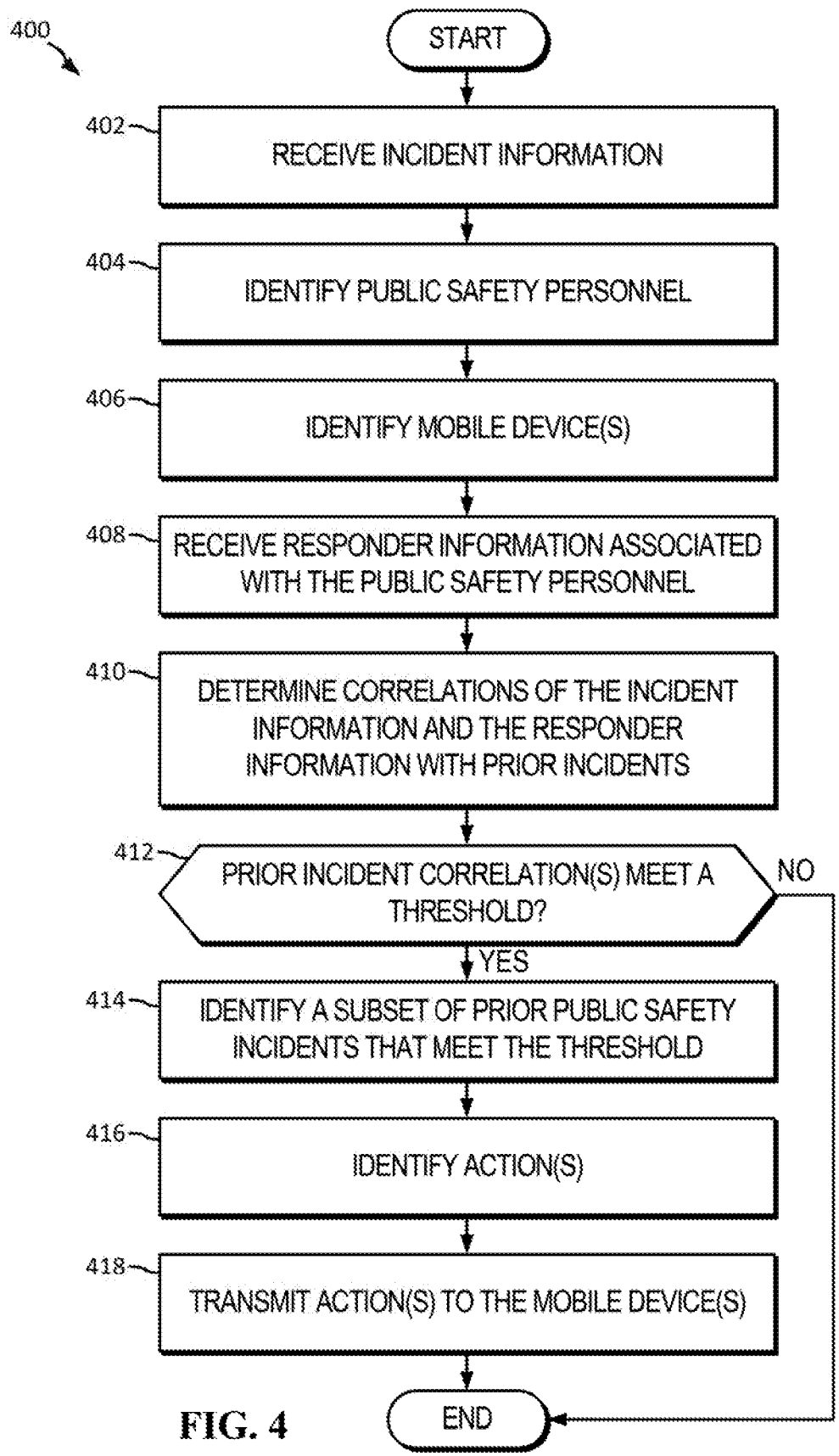
FIG. 4 is a flowchart of a method of generating action recommendations at a recommendation server in accordance with some embodiments.

Flowcharts representative of example machine readable instructions for implementing the recommendation server 140 of FIG. 1 are shown in FIGS. 3-4. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 3-4, many other methods of implementing the example recommendation server 140 may alternatively be used. For example, the order of execution of the blocks may be changed, and/or some of the blocks described may be changed, eliminated, or combined.

The program 300 of FIG. 3 operates to handle training of models by the example recommendation server 140. The program 300 of FIG. 3 begins when the example feature handler 152 of the example recommendation server 140 receives an identification of an action performed at a user device 102, 106, 110 (e.g., a notification of the action transmitted by the example information transceiver 204 of the example action manager 104 FIG. 2) (block 302). The identification of the action may include information about the outcome of the action (e.g., an amount of time for completion of a task associated with the action, a rating of the result of the action, an indication of whether backup support (e.g., backup police officers) were needed, and the like. The example feature handler 152 receives incident information (e.g., an identification of an incident type, context information about the incident received from the example action manager 104 and/or the example public safety personnel and operations datastore(s) and sensor(s) data 130, and the like) (block 304). The example feature handler 152 receives responder information (e.g., information about public safety personnel that may be available to respond to the incident received from the example action manager 104 and/or the example public safety personnel and operations datastore(s) and sensor(s) data 130) (block 306).

For example, in blocks 302-306 the feature handler 152 receives information about an action that was performed at the user device 102 (e.g., an action requested at the user device 102 and/or an action that was recommended by the recommendation server 140 and approved at the user device 102) and receives context/responder information associated with the time at which the action was performed.

The example feature handler 152 stores an association of the action performed with the context information (incident information and responder information) in the example training datastore 154 (block 308). Thus, the association of information is stored in the training datastore 154 as prior incident information that may be used by the model trainer 156 to generate models of desired actions when the user device 102 is situated in a similar context to handle a similar incident.

The example model trainer 156 determines if retraining is to be performed (block 310). For example, the model trainer 156 may trigger retraining when the training data recorded in the example training datastore 154 indicates that a number of recommended actions not taken (e.g., instances where a recommended action was presented and a different action request (or a refusal to perform the recommended action) was received by the example user device 102) meets or exceeds a threshold. In another example, the model trainer 156 may determine if a sufficient number of events are recorded in the example training datastore 154, if a threshold duration of time has passed since a previous retraining, if a manual retraining request has been received, and the like. When retraining is not to be performed, the program 300 of FIG. 3 ends.

When retraining is to be performed (block 310), the example model trainer retrieves training information from the example training datastore 154 (block 312). According to the illustrated example, the training datastore 154 stores new training information (e.g., information not previously utilized for training) as well as all prior training data to enable the model trainer 156 to retrain models utilizing the full set of available training information. Alternatively, the model trainer 156 may use an incremental training algorithm that supplements existing models using only the new training information. In another embodiment, the new and prior training information may be selected using a threshold that eliminates older training information in favor of newer training information. Additionally or alternatively, training data may be removed from the example training datastore 154 when the training data has been used to generate a model that was later found to recommend actions that were not preferred by public safety personnel (e.g., recommended actions that are frequently ignored, disregarded, rejected, and the like). Additionally or alternatively, training data may be removed from the example training datastore 154 when the example model trainer 156 determines that the training data is redundant to other training data (e.g., other training data in the training datastore 154 and/or other training data previously utilized in training models).

The example model trainer 156 performs retraining of models from the example model datastore 158 (block 314). For example, the model trainer 156 may selectively retrain models based on the available new training information (e.g., when models are associated with a particular incident type and there is no new training information for a particular incident type, retraining will not be performed for the model associated with the particular incident type).

The example model trainer 156 then stores new/updated models in the example model datastore 158 and/or transmits the new/updated models to the example user devices 102, 106, 110 for storage in the example offline model datastore 210 of the example action managers 104, 108, 112, respectively (block 316). The program 300 of FIG. 3 then ends until a further action notification is received.

The program 400 of FIG. 4 operates to generate a recommendation of action(s) to be presented and/or performed at the example user devices 102, 106, 110. The program 400 of FIG. 4 begins when the example feature handler 152 of the example recommendation server 140 receives incident information (block 402). For example, the incident information may identify an incident type, a location of the incident, a severity rating of the incident, or any other context information. According to the illustrated example, the incident information is received at the feature handler 152 via the network gateway 150 from the user devices 102, 106, 110 and/or the example public safety personnel operations datastore(s) and sensor(s).

The example feature handler 152 identifies public safety personnel available to respond to the incident (block 404). In some examples, only one public safety personnel will respond to the incident (e.g., the incident is a police officer patrolling a neighborhood to look for parking violations). In other examples, a plurality of public safety personnel may be identified by the example feature handler 152 (e.g., from a personnel database in the example public safety personnel and operations datastore(s) and sensor(s) data 130, from an identification of the user devices 102, 106, 110 that are registered, available, connected, and the like).

The example feature handler 152 identifies the user devices 102, 106, 110 (e.g., mobile devices) that are associated with the identified public safety personnel (block 406). The example feature handler 152 further receives responder information associated with the public safety personnel (block 408). The responder information may include names, ranks, agency association, identification of assigned tasks/roles, a number of times that tasks/roles have previously been assigned, experience levels of the public safety personnel, scheduling information for the public safety personnel, availability information for the public safety personnel, location of the public safety personnel, and the like. The responder information may be received at the feature handler 152 via the network gateway 150 from the example user devices 102, 106, 110 and/or from the example public safety personnel and operations datastore(s) and sensor(s) data 130.

The example recommendation engine 160 determines correlations of the incident information and responder information with prior public safety incidents (block 410). For example, the recommendation engine 160 may correlate the incident information and responder information with prior incident information stored in the model datastore 158 (e.g., may correlate the information with operations of models generated by the example model trainer 156).

For example, the recommendation engine 160 may develop models for an action by correlating context information from prior public safety incidents with outcomes (e.g., applications executed by a user in responding to the public safety incident, personnel assignments to tasks/roles, and the like). The context information may include tasks/roles assigned to public safety personnel and/or group(s) to which the public safety personnel belong during responding to the public safety incident. For example, the tasks/role assigned to public safety personnel during public safety incident response may lead to differentiation in the action that may be recommended by the recommendation engine 160 (e.g., the recommendation engine 160 may learn a model that leads to recommending an action of starting a ticket writing application when a public safety person is assigned to a parking patrol task/role and the model may lead to recommending an action of starting a note taking action when a public safety person is assigned to a surveillance task/role).

The example recommendation engine 160 determines if any of the prior incident correlations meet a threshold (block 412). For example, the recommendation engine 160 may determine if a correlation of the incident information and responder information with any of the models stored in the example model datastore 158 meets a threshold score. When the example recommendation engine 160 does not identify a correlation that meets a threshold, the program 400 of FIG. 4 ends.

When the example recommendation engine 160 identifies one or more correlations that meet a threshold (block 414), the example recommendation engine 160 identifies actions corresponding to the identified correlations (block 416). The example recommendation engine 160 transmits the identified actions to the example user devices 102, 106, 110 for presentation and/or performance of the action(s) (block 418). The program 400 of FIG. 4 then ends.

Figure 5:
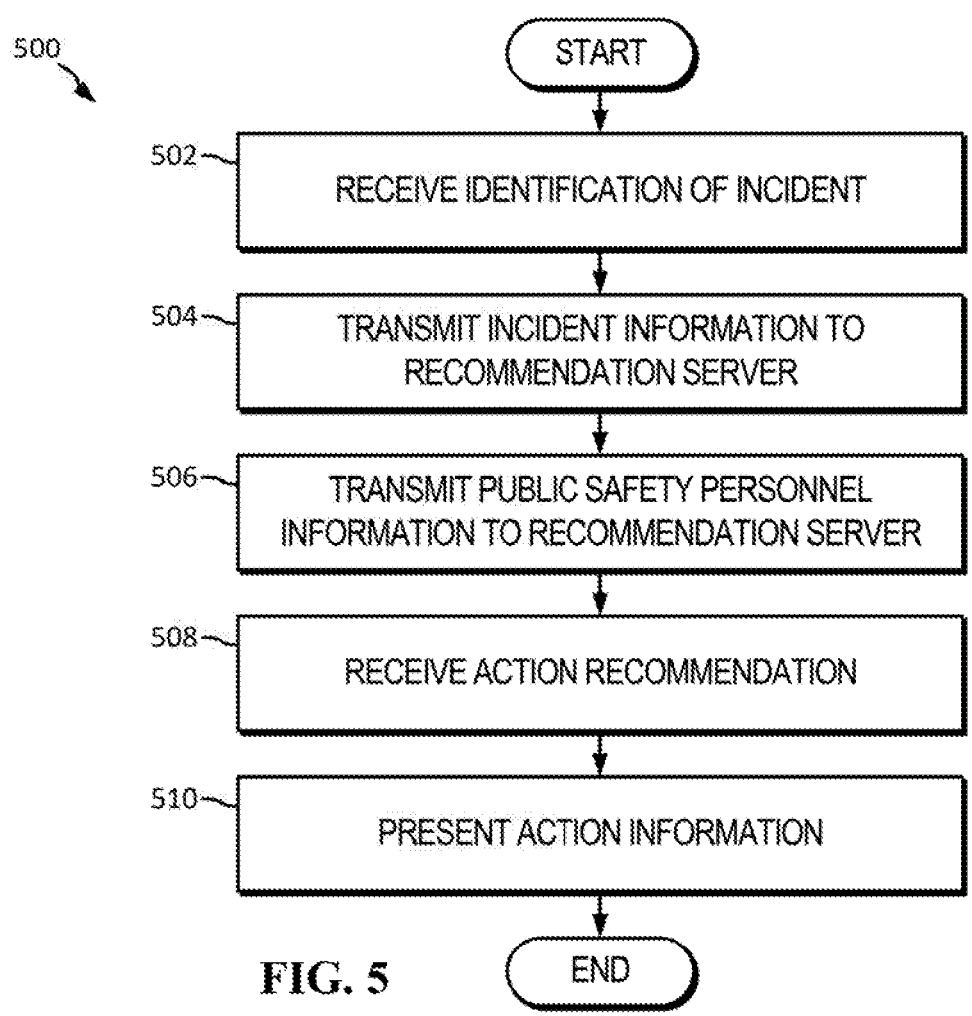
FIG. 5 is a flowchart of a method of requesting and presenting recommended actions in accordance with some embodiments.
Figure 6:
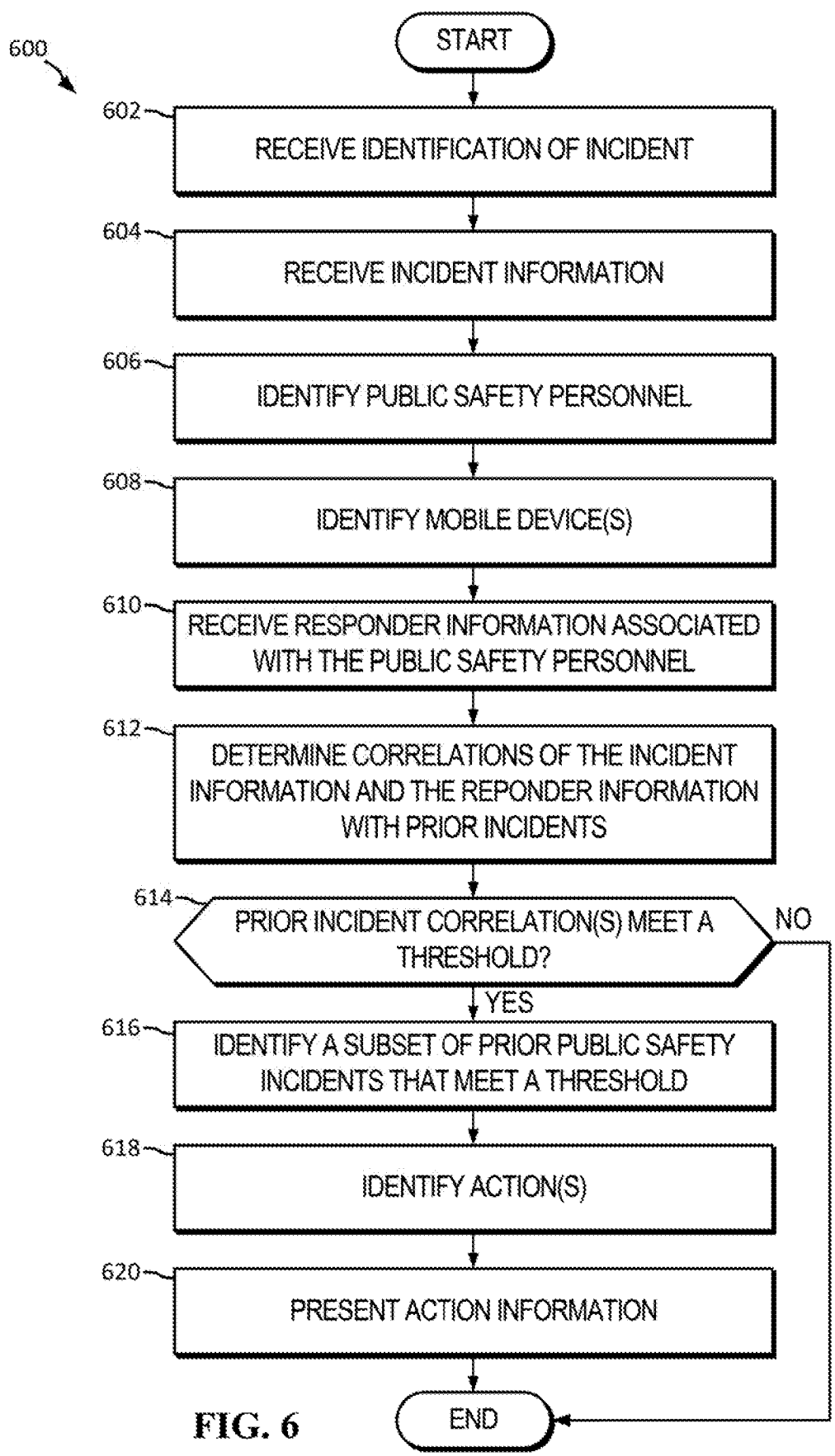
FIG. 6 is a flowchart of a method of generating action recommendations at a user device in accordance with some embodiments.

Flowcharts representative of example machine readable instructions for implementing the action manager 104 of FIG. 1 and/or FIG. 2 (and similarly the example action manager 108 and/or the example action manager 112) are shown in FIGS. 5-6. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5-6, many other methods of implementing the example action manager 104 may alternatively be used. For example, the order of execution of the blocks may be changed, and/or some of the blocks described may be changed, eliminated, or combined.

The program 500 of FIG. 5 operates to retrieve an action recommendation from the example recommendation server 140. The program 500 of FIG. 5 begins when example user interface 202 receives identification of an incident (block 502). For example, a user interface element of the example user interface 202 may receive an identification of an event type. The example information transceiver 204 transmits the incident information to the example recommendation server 140 (block 504). The example incident information may include context information for the incident (e.g., locations, status of public safety personnel, radio communication settings, group assignments, and the like). The example information transceiver 204 additionally transmits public safety personnel information to the example recommendation server 140 (block 506).

The example recommendation server 140 processes the information transmitted by the example information transceiver 204 and generates recommended action(s) (e.g., using the process described in conjunction with FIG. 4).

The example action receiver 206 receives the action recommendation(s) from the example recommendation server 140 (block 508). The example user interface 202 presents the recommended action(s) in a user interface (e.g., a graphical user interface, an audible user interface, an external presentation device interface, and the like) (block 510). Alternatively, the example action receiver 206 may perform some or all of the recommended action(s) (e.g., may open an application). The program 500 of FIG. 5 then ends.

The program 600 of FIG. 6 operates to identify recommended actions at the example action manager 104 of the example user device 102. The program 600 of FIG. 6 begins when the example user interface 202 receives an identification of an incident (block 602). The example local recommendation engine 212 receives incident information from the example user interface 202 and/or the example information transceiver (block 604). The example local recommendation engine 212 identifies public safety personnel available to respond to the incident (block 606). For example, public safety personnel information may be retrieved by the information transceiver 204 and provided to the local recommendation engine 212.

The local recommendation engine 212 identifies the user devices 102, 106, 110 (e.g., mobile devices) that are associated with the identified public safety personnel (block 608). The example local recommendation engine 212 further receives responder information associated with the public safety personnel (block 610).

The example local recommendation engine 212 determines correlations of the incident information and responder information with prior public safety incidents (block 612). For example, the local recommendation engine 212 may correlate the incident information and responder information with prior incident information stored in the offline model datastore 210 (e.g., models received from the example recommendation server 140 via the example model interface 208).

The example local recommendation engine 212 determines if any of the prior incident correlations meet a threshold (block 614). For example, the local recommendation engine 212 may determine if a correlation of the incident information and responder information with any of the models stored in the example offline model datastore 210 meets a threshold score. When the example local recommendation engine 212 does not identify a correlation that meets a threshold, the program 600 of FIG. 6 ends.

When the example local recommendation engine 212 identifies one or more correlations that meet a threshold (block 616), the example local recommendation engine 212 identifies actions corresponding to the identified correlations (block 618). The example local recommendation engine 212 communicates the identified actions to the example user interface 202 for presentation and/or performance of the action(s) (block 620). The program 600 of FIG. 6 then ends.

As mentioned above, the example processes of FIGS. 3-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
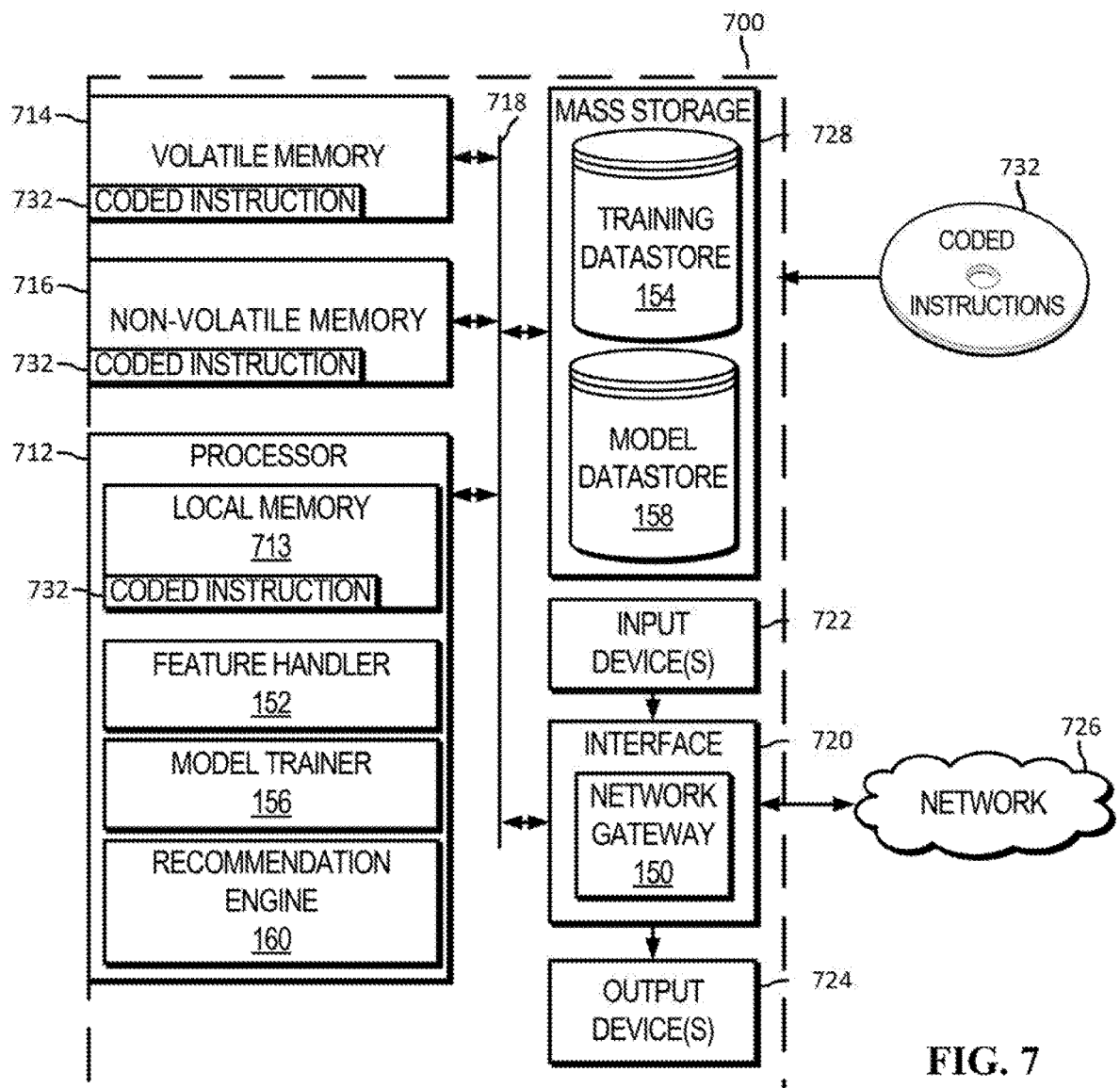
FIG. 7 is a block diagram of an example processor platform capable of executing the instructions of FIGS. 3-4 to implement a recommendation server in accordance with some embodiments.

FIG. 7 is a block diagram of an example processor platform 700 capable of executing the instructions of FIGS. 3-4 to implement the recommendation server 140 of FIG. 1. The processor platform 700 can be, for example, a server, a personal computer, a mobile device (e.g., a cell phone, a smart phone, a Land Mobile Radio, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. The example processor 712 includes the example feature handler 152, the example model trainer 156, and/or the example recommendation engine 160.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, a wireless network, and the like). The example interface 720 includes the example network gateway 150.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. The example mass storage devices 728 include the example training datastore 154 and the example model datastore 158.

The coded instructions 732 may embody the instructions of FIG. 3 and/or FIG. 4. The coded instructions 732 may be stored in the mass storage device 728, in the volatile memory 714, in the non-volatile memory 716, and/or on a removable tangible computer readable storage medium such as a CD or DVD.

Figure 8:
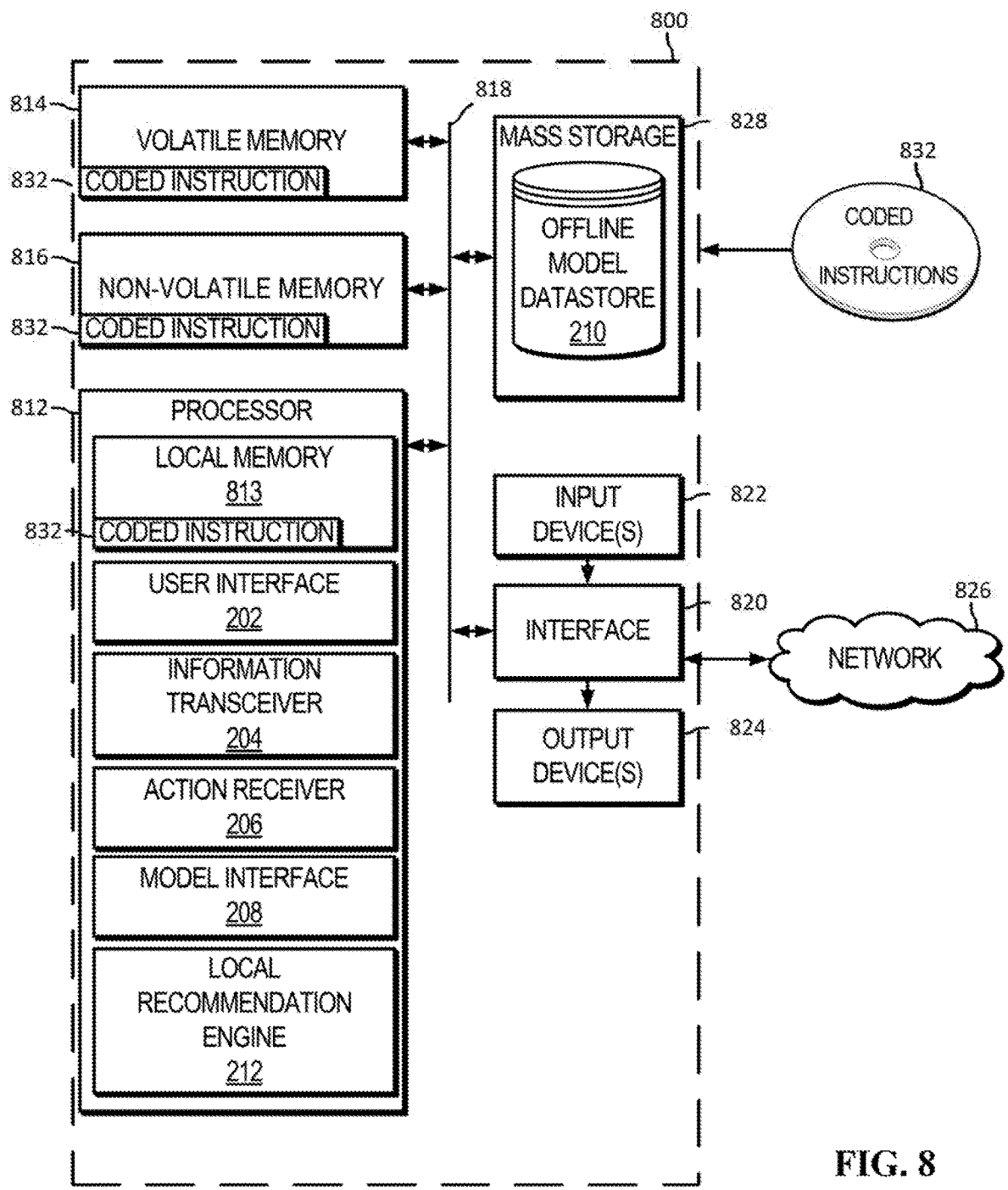
FIG. 8 is a block diagram of an example processor platform capable of executing the instructions of FIGS. 5-6 to implement an action manager of a user device in accordance with some embodiments.

FIG. 8 is a block diagram of an example processor platform 800 capable of executing the instructions of FIGS. 5-6 to implement the action manager 104 of FIG. 1 and/or FIG. 2. The processor platform 800 can be, for example, a server, a personal computer, a mobile device (e.g., a cell phone, a smart phone, a Land Mobile Radio, a tablet such as an iPad™), a personal digital assistant (PDA), an Internet appliance, or any other type of computing device.

The processor platform 800 of the illustrated example includes a processor 712. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. The example processor 812 includes the example user interface 202, the example information transceiver 204, the example action receiver 206, the example model interface 208, and the example local recommendation engine 212.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, a wireless network, and the like).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example mass storage devices 828 include the example offline model datastore 210.

The coded instructions 832 may embody the instructions of FIG. 5 and/or FIG. 6. The coded instructions 832 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture facilitate the recommendation of actions for user devices of public safety personnel. Recommending actions may reduce the distraction of users, allowing public safety personnel to focus on their activities while supplementing the performance of those activities may automatically provide recommended actions such as loading an application, presenting recommended task assignments, and the like. In addition, the recommended actions can be identified using information that is not available to individual public safety personnel (e.g., information about the availability of all members of the public safety group, information about connection status of user devices of public safety personnel, information contained in database records associated with public safety personnel, and the like). Accordingly, even one of the public safety personnel that is new to a job and/or department, can benefit from the wide array of context information that is available to the disclosed recommendation engine.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for performing actions in a public safety incident, the method comprising:
   receiving, by a public safety recommendation engine, a first set of incident information associated with the public safety incident;
   identifying, by the public safety recommendation engine, at least one public safety personnel and corresponding mobile device associated with the public safety incident;
   receiving, by the public safety recommendation engine, a second set of responder information associated with the at least one public safety personnel, wherein the second set of responder information includes information identifying at least one role assigned to the at least one public safety personnel;
   receiving, by the public safety recommendation engine, from mobile devices of public safety personnel associated with prior public safety incidents, one or more other sets of public safety incident information and responder information associated with the prior public safety incidents including information related to mobile device applications that were respectively launched at the mobile devices of public safety personnel associated with the prior public safety incidents, wherein the public safety personnel associated with the prior public safety incidents include at least one public safety personnel different from the at least one public safety personnel associated with the public safety incident;
   correlating, by the public safety recommendation engine, the first set of incident information and the second set of responder information with the one or more other sets of public safety incident information and responder information associated with prior public safety incidents;
   identifying, by the public safety recommendation engine, a subset of the prior public safety incidents that meet a minimum correlation threshold;
   identifying, by the public safety recommendation engine, from the information related to the mobile device applications received from the mobile devices of public safety personnel associated with the prior public safety incidents and by analyzing the information about the at least one role with role assignments associated with prior public safety incidents, at least one mobile device application that was launched at mobile devices of public safety personnel associated with the subset of the prior public safety incidents during a time period corresponding to the subset of the prior public safety incidents, wherein the identified at least one mobile device application corresponds to a ticket writing application when the at least one role assigned to the at least one public safety personnel is identified as a parking patrol role and a note taking action when the at least one role assigned to the at least one public safety personnel is identified as a surveillance role; and
   automatically launching, by the public safety recommendation engine, the at least one mobile device application on the corresponding mobile device of the at least one public safety personnel when the at least one public safety personnel is assigned to the public safety incident.

2. The method as defined in claim 1, wherein the public safety recommendation engine identifies the at least one mobile device application via at least one of a machine learning analysis of the one or more other sets of public safety incident information and responder information, an artificial intelligence analysis of the one or more other sets of public safety incident information and responder information, or an evolutionary algorithm, including a genetic algorithm, analysis of the one or more other sets of public safety incident information and responder information.

3. The method as defined in claim 1, wherein the first set of incident information identifies at least one of an agency and a group associated with the public safety incident.

4. The method as defined in claim 1, wherein the second set of responder information identifies at least one of an agency and a group associated with the at least one public safety personnel.

5. The method as defined in claim 1, wherein identifying the at least one mobile device application includes identifying a recommended application having a correlation that exceeds correlations for other applications that were launched in association with the prior incidents.

6. The method as defined in claim 1, wherein the minimum correlation threshold is a threshold score associated with a machine learning model.

7. The method as defined in claim 1, wherein the second set of responder information includes location information indicating a proximity of the at least one public safety personnel to a location of the public safety incident.

8. The method as defined in claim 1, wherein the second set of responder information includes an experience level of the at least one of the public safety personnel, the experience level associated with a number of times that the at least one of the public safety personnel has been previously assigned a role associated with a public safety incident.

9. The method as defined in claim 1, further including retraining, by the public safety recommendation engine, a model in response to detecting, following identifying the at least one mobile device application, a user input from the at least one public safety personnel indicating that the at least one mobile device application is not preferred.

10. A recommendation server to generate recommendations for performing actions in a public safety incident, the recommendation server comprising:
a network interface communicatively coupled to a network;
a processor communicatively coupled to the network interface; and
memory storing instructions that, when executed, cause the processor to:
receive a first set of incident information associated with the public safety incident;
identify at least one public safety personnel and corresponding mobile device associated with the public safety incident;
receive a second set of responder information associated with the at least one public safety personnel, wherein the second set of responder information includes information identifying at least one role assigned to the at least one public safety personnel;
receive, from mobile devices of public safety personnel associated with prior public safety incidents, one or more other sets of public safety incident information and responder information associated with the prior public safety incidents including information related to mobile device applications that were respectively launched at the mobile devices of public safety personnel associated with the prior public safety incidents, wherein the public safety personnel associated with the prior public safety incidents include at least one public safety personnel different from the at least one public safety personnel;
correlate the first set of incident information and the second set of responder information with the one or more other sets of public safety incident information and responder information associated with the prior public safety incidents;
identify a subset of the prior public safety incidents that meet a minimum correlation threshold;
identify, from the information related to the mobile device applications received from the mobile devices of public safety personnel associated with the prior public safety incidents and by analyzing the information about the at least one role with role assignments associated with prior public safety incidents, at least one mobile device application that was launched at mobile devices of public safety personnel associated with the subset of the prior public safety incidents during a time period corresponding to the subset of the prior public safety incidents, wherein the identified at least one mobile device application corresponds to a ticket writing application when the at least one role assigned to the at least one public safety personnel is identified as a parking patrol role and a note taking action when the at least one role assigned to the at least one public safety personnel is identified as a surveillance role; and
automatically launch the at least one mobile device application on the corresponding mobile device of the at least one public safety personnel when the at least one public safety personnel is assigned to the public safety incident.

11. The recommendation server as defined in claim 10, wherein at least some of the second set of responder information is received from the mobile device via the network interface.

12. The recommendation server as defined in claim 10, wherein the instructions, when executed, cause the processor to generate a model based on the one or more other sets of public safety incident information and responder information associated with prior incidents.

13. The recommendation server as defined in claim 12, wherein the instructions, when executed, cause the processor to transmit the model to the mobile device.

14. The recommendation server as defined in claim 13, wherein the public safety recommendation engine identifies the at least one mobile device application via a machine learning analysis of the one or more other sets of public safety incident information and responder information.

15. The recommendation server as defined in claim 10, wherein the instructions cause the processor to identify the at least one mobile device application by identifying a recommended application having a correlation that exceeds correlations for other applications that were launched in association with the prior incidents.

16. A mobile device useable for performing actions in a public safety incident, the mobile device comprising:
a network interface communicatively coupled to a network;
a processor communicatively coupled to the network interface; and memory storing instructions that, when executed, cause the processor to:
receive a first set of incident information associated with the public safety incident;
identify at least one public safety personnel and the mobile device associated with the public safety incident;
receive a second set of responder information associated with the at least one public safety personnel, wherein the second set of responder information includes information identifying at least one role assigned to the at least one public safety personnel
receive, from mobile devices of public safety personnel associated with prior public safety incidents, one or more other sets of public safety incident information and responder information associated with the prior public safety incidents including information related to mobile device applications that were respectively launched at the mobile devices of public safety personnel associated with the prior public safety incidents, wherein the public safety personnel associated with the prior public safety incidents include at least one public safety personnel different from the at least one public safety personnel;
determine a correlation of the first set of incident information and the second set of responder information with the one or more other sets of public safety incident information and responder information associated with prior incidents;
identify a subset of prior public safety incidents that meet a minimum correlation threshold;
identify, from the information related to the mobile device applications received from the mobile devices of public safety personnel associated with the prior public safety incidents and by analyzing the information about the at least one role with role assignments associated with prior public safety incidents, at least one mobile device application that was launched at mobile devices of public safety personnel associated with the subset of the prior public safety incidents during a time period corresponding to the subset of the prior public safety incidents, wherein the identified at least one mobile device application corresponds to a ticket writing application when the at least one role assigned to the at least one public safety personnel is identified as a parking patrol role and a note taking action when the at least one role assigned to the at least one public safety personnel is identified as a surveillance role; and
launch the at least one mobile device application at the mobile device of the at least one public safety personnel when the at least one public safety personnel is assigned to the public safety incident.

17. The method of claim 1, further comprising:
receiving, from the mobile devices of public safety personnel associated with the prior public safety incidents, information related to radio communication channels that were operated at the mobile devices of public safety personnel associated with the prior public safety incidents;
identifying, from the information related to the radio communication channels received from the mobile devices of public safety personnel associated with the prior public safety incidents, at least one radio communication channel that was operated at mobile devices of public personnel associated with the subset of the prior public safety incidents; and
automatically selecting the at least one radio communication channel for operation on the corresponding mobile device of the at least one public safety personnel when the at least one public safety personnel is assigned to the public safety incident.

* * * * *